United States Patent
Kim et al.

(10) Patent No.: US 9,356,277 B2
(45) Date of Patent: May 31, 2016

(54) BATTERY PACK INCLUDING SPACER RECEIVING CONDUCTIVE MEMBER

(75) Inventors: Ki-Woong Kim, Yongin-si (KR); Jae-Hoon Choi, Yongin-si (KR); Sung-Kyun Lim, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 796 days.

(21) Appl. No.: 13/605,573

(22) Filed: Sep. 6, 2012

(65) Prior Publication Data

US 2013/0196181 A1 Aug. 1, 2013

Related U.S. Application Data

(60) Provisional application No. 61/593,176, filed on Jan. 31, 2012.

(51) Int. Cl.
| | |
|---|---|
| H01M 2/20 | (2006.01) |
| H01M 2/10 | (2006.01) |
| H01M 2/24 | (2006.01) |
| H01M 10/42 | (2006.01) |

(52) U.S. Cl.
CPC .............. *H01M 2/202* (2013.01); *H01M 2/105* (2013.01); *H01M 2/1055* (2013.01); *H01M 2/204* (2013.01); *H01M 2/24* (2013.01); *H01M 10/425* (2013.01)

(58) Field of Classification Search
CPC ... H01M 2/105; H01M 2/1055; H01M 2/204; H01M 2/24
See application file for complete search history.

(56) References Cited

U.S. PATENT DOCUMENTS

| | | | |
|---|---|---|---|
| 6,724,170 B1* | 4/2004 | Maggert et al. | 320/107 |
| 2005/0271934 A1* | 12/2005 | Kiger et al. | 429/159 |
| 2006/0032667 A1 | 2/2006 | Sato | |
| 2009/0246615 A1 | 10/2009 | Park | |
| 2011/0151285 A1* | 6/2011 | Hong et al. | 429/7 |
| 2011/0192020 A1 | 8/2011 | Hong et al. | |

FOREIGN PATENT DOCUMENTS

| | | |
|---|---|---|
| CN | 102280602 A | 12/2011 |
| JP | 2004-265610 A | 9/2004 |
| KR | 10 2005 0026162 | 3/2005 |
| KR | 10 2011 0002355 | 1/2011 |

OTHER PUBLICATIONS

Extended European Search Report dated Apr. 5, 2013 for corresponding EP Application No. 12185882.3.
Chinese Office Action issued in Application No. 201310011560.2 on Feb. 1, 2016.

* cited by examiner

*Primary Examiner* — Zachary Best
(74) *Attorney, Agent, or Firm* — Knobbe Martens Olson & Bear LLP

(57) ABSTRACT

A battery pack that has one or more batteries and a protection circuit module. The battery pack includes protection tab members that connect to the batteries and the tab members include a tab that has a coupling component that extends towards the batteries. The battery pack also includes a conductive member that connects the connection tab member to the protection circuit module. The battery pack also includes spacers that receive the connection tabs and that couple to the coupling component of the connection tabs and are interconnected to the conductive member and the spacers.

18 Claims, 5 Drawing Sheets

BATTERY PACK INCLUDING SPACER RECEIVING CONDUCTIVE MEMBER

CROSS-REFERENCE TO RELATED APPLICATIONS

This application claims the benefit of U.S. Provisional Patent Application No. 61/593,176 filed Jan. 31, 2012 which is hereby incorporated by reference in its entirety.

BACKGROUND

1. Field

An aspect of the present invention relates to a battery pack, and more particularly, to a battery pack capable of facilitating connection between a connection tab and a coverlay or similar member.

2. Description of the Related Art

In general, it is difficult to use only one battery cell as a power source of a notebook computer, etc. Therefore, a battery pack having a plurality of battery cells connected in series and/or parallel is configured as a power source employed in a notebook computer, etc. so as to obtain a desired voltage and capacity. The connection of the plurality of battery cells in series and/or parallel is often performed by soldering using a connection tab.

A protective circuit module such as a charging/discharging control circuit and/or a protection circuit may be mounted on the plurality of battery cells. The protective circuit module may be electrically connected to the plurality of battery cells using a coverlay or similar member. That is, one side of the coverlay is fixed to the protective circuit module, and the other side of the coverlay is fixed to the connection tab for connecting the plurality of battery cells.

SUMMARY

Embodiments provide a battery pack in which a connection tab and a spacer are physically fastened to each other, so that the spacer can be fixed without its vertical movement, thereby facilitating soldering between the connection tab and a coverlay or similar member.

Embodiments also provide a battery pack in which a connection tab and a coverlay or conductive member are screw-fastened to each other on a spacer, so that a soldering operation can be omitted.

According to an aspect of the present invention, there is provided a battery pack including: a plurality of battery cells electrically connected to one another; at least one connection tab through which the plurality of battery cells are electrically connected to one another; a protective circuit module formed at one side of the plurality of battery cells; a coverlay or conductive member through which the protective circuit module and the at least one connection tab are electrically connected to each other; and a spacer positioned between the plurality of battery cells and the coverlay or conductive member.

In another aspect of the present invention, there is provided a battery pack comprising at least one battery, and at least one connection tab member that connects the at least one battery, wherein the at least one connection tab member includes a connection tab that has a coupling component that extends outward from the connection tab member. In this aspect, the battery pack further includes a protection circuit module and a conductive member that electrically interconnects the at least one connection tab member to the protection circuit module. In this aspect, the battery pack further includes a spacer that has a member that is engaged with the coupling component of the at least one connection tab when the spacer receives the conductive member and is positioned in a first position proximate the at least one battery, wherein the connection tab of the at least one connection tab member is interconnected to the conductive member and to the member of the spacer.

A through-hole through which the connection tab passes may be formed in the spacer, and the connection tab may be bent toward an upper surface of the spacer by passing through the through-hole of the spacer. A first fastening portion may be formed at one side of the through-hole of the direction in which the connection tab is bent, and a second fastening portion may be formed at a position of the connection tab corresponding to the first fastening portion.

The first fastening portion may be formed in the shape of a hook, and the second fastening portion may be formed in the shape of a hook latching hole for accommodating the hook.

The other side of the through-hole, in which the first fastening portion is not formed, may be formed to be inclined.

The spacer may be positioned in a space between the plurality of battery cells and a case for accommodating the plurality of battery cells. The spacer may be formed so that, on the vertical section of the spacer, the shape of a top surface corresponds to the shape of an inner surface of the case and the shape of a bottom surface corresponds to the shape of an outer surface of the plurality of battery cells.

The connection tab and the coverlay or conductive member may be connected to each other by soldering.

Alternatively, the connection tab and the coverlay or conductive member may be connected to each other using a separate fastening member. A first fastening hole may be formed in the connection tab, and a second fastening hole may be formed at a position of the coverlay or conductive member corresponding to the first fastening hole. A coupling groove may be formed at a position of the spacer corresponding to the second fastening hole.

Accordingly, the fastening member can be fastened to the coupling groove by passing through the first and second fastening holes. The coupling groove may have a shape to which the fastening member such as a screw is fastened.

A groove having a shape corresponding to the conductive member may be formed on a top surface of the spacer so that the conductive member is mounted thereon.

A positive (+) symbol is formed at one side of the spacer, and a negative (−) symbol is formed at the other side of the spacer. Thus, it is possible to prevent the direction of the spacer from being reversed.

The battery cell may be a cylindrical battery cell.

According to the present invention, the connection tab and the spacer are physically fastened to each other, so that the fixing ability of the spacer can be improved, thereby more easily performing a soldering operation between the connection tab and the conductive member.

Further, the connection tab and the coverlay or conductive member are screw-fastened to each other on the spacer, so that the soldering operation can be omitted. Thus, it is possible to simplify the manufacturing process of the battery pack and to equalize the quality of the battery pack.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
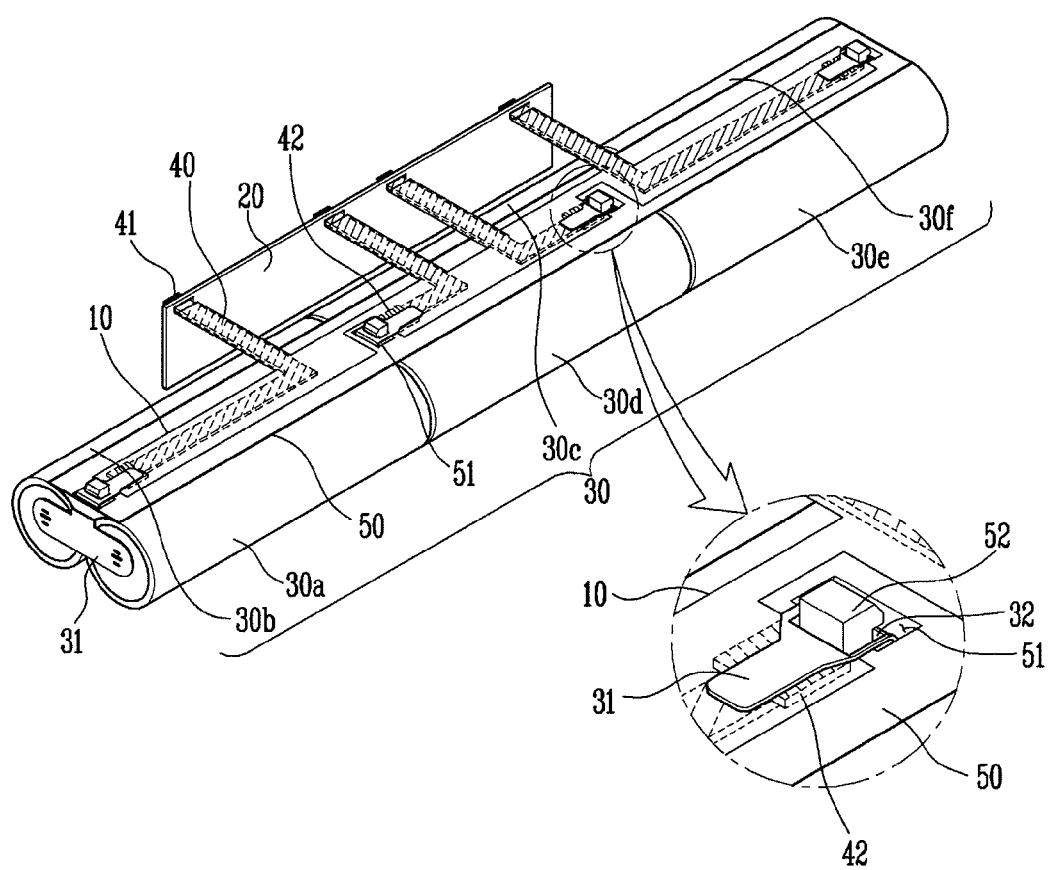
FIG. 1 is a perspective view showing a battery pack according to a first embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements. In the drawings, the thickness or size of layers are exaggerated for clarity and not necessarily drawn to scale.

Figure 2:
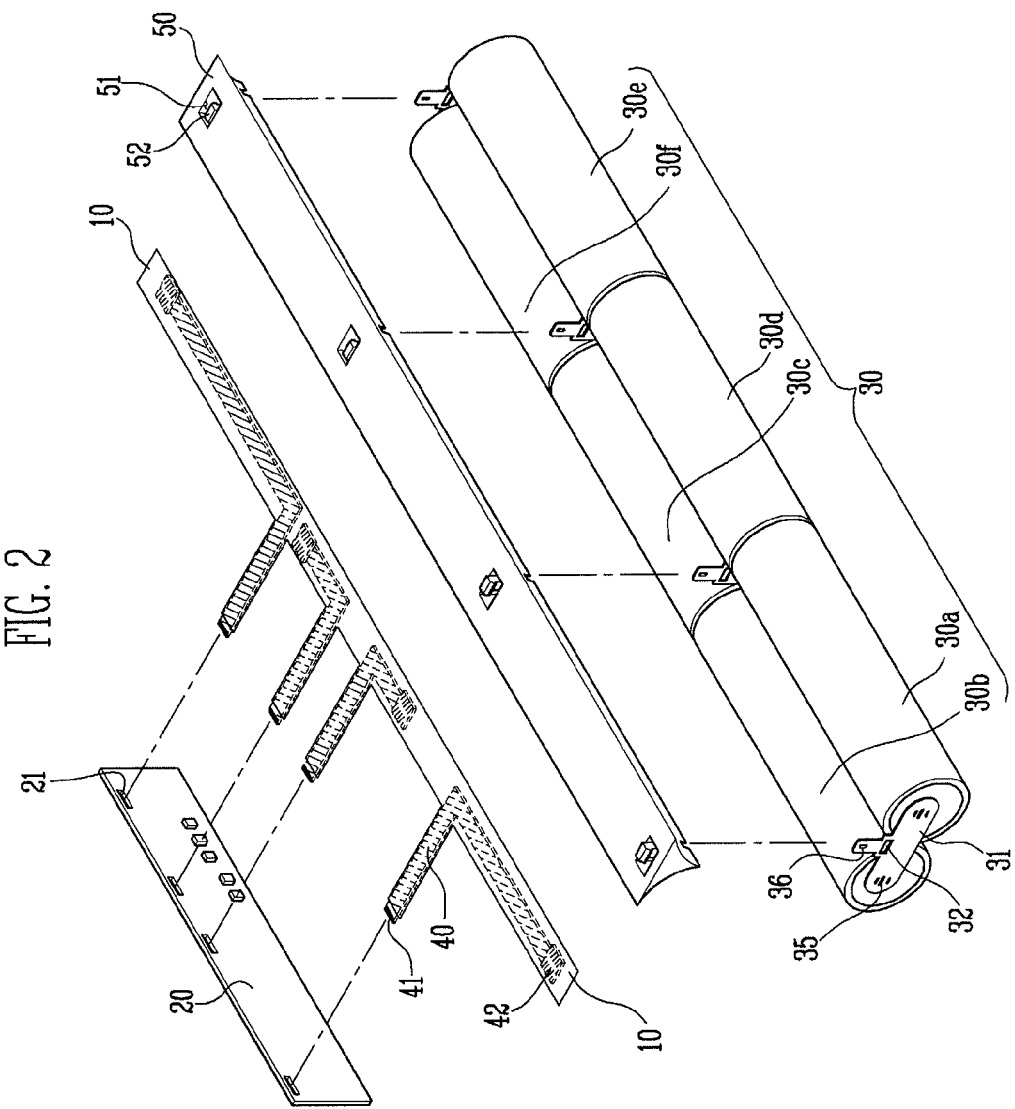
FIG. 2 is an exploded perspective view showing the battery pack according to the first embodiment of the present invention.

FIG. 1 is a perspective view showing a battery pack according to a first embodiment of the present invention. FIG. 2 is an exploded perspective view showing the battery pack according to the first embodiment of the present invention.

Referring to FIGS. 1 and 2, the battery pack according to this embodiment includes a plurality of cylindrical battery cells 30a, 30b, 30c, 30d, 30e and 30f (hereinafter, commonly designated by '30' except when it is necessary to describe each of the battery cells), which are electrically connected to one another, and at least one connection tab 31 through which the plurality of battery cells 30 are electrically connected to one another. A protective circuit module (PCM) 20 is provided at one side of the plurality of battery cells 30, and the PCM 20 and the at least one connection tab 31 are electrically connected to each other through one or more conductive members or coverlays 40. The battery pack according to this embodiment further includes a spacer 50 provided between the plurality of battery cells 30 and the conductive member 40.

More preferably, the spacer 50 may be formed to fill a space between the plurality of battery cells 30 and a case (not shown) for accommodating the plurality of battery cells 30. That is, the spacer 50 may be formed so that, on the vertical section of the spacer 50, the shape of a top surface corresponds to the shape of an inner surface of the case and the shape of a bottom surface corresponds to the shape of an outer surface of the plurality of battery cells 30.

A through-hole 51 through which the at least one connection tab 31 passes is formed in the spacer 50, and the connection tab 31 passes through the through-hole 51 of the spacer 50 and is then bent toward an upper surface of the spacer 50. In this case, a first fastening portion 52 is formed at one side of the through-hole 51 of the direction in which the connection tab 31 is bent, and a second fastening portion 32 is formed at a position of the connection tab 31 corresponding to the first fastening portion 52. Here, the first fastening portion 52 is formed in the shape of a hook, and the second fastening portion 32 is formed in the shape of a hook latching hole in which the hook is accommodated.

As described above, the first fastening portion 52 of the spacer 50 is inserted into the second fastening portion 32 of the connection tab 31, so that it is possible to inhibit vertical movement of the spacer 50. Accordingly, a soldering operation between the connection tab 31 and the conductive member 40 can be more easily performed on the spacer 50.

A slope portion 53 (See FIG. 5) may be formed at the other side of the through-hole 51, on which the first fastening portion 52 is not formed. The slope portion 53 may provided a space so that the first fastening portion 52 of the spacer 50 is more easily inserted into the second fastening member 32 of the connection tab 31.

The PCM 20 in this embodiment has electronic components mounted therein, and a protection circuit, etc is configured in the PCM 20. The protection circuit includes a circuit for detecting overcharge or overdischarge of a battery and controlling current, a circuit for detecting overdischarge of a battery and blocking current, etc. An insertion hole 21 into which an end portion of the conductive member 40 is inserted may be formed on the PCM 20 where the electronic components, the protection circuit, etc. are not positioned.

The plurality of battery cells 30 is formed into a structure of 2S3P, in which the six battery cells 30a, 30b, 30c, 30d, 30e and 30f are connected in series and parallel. In this case, the plurality of battery cells 30 are electrically connected to one another by the connection tab 31, and the connection tab 31 positioned at an outermost end of the plurality of the battery cells 30 may be used as a high current terminal in the battery pack.

The conductive member 40 through which the PCM 20 and the plurality of battery cells 30 are electrically connected to each other is formed in the shape of a thin and long plate, and may be made of a conductive material such as copper (Cu) or nickel (Ni). An insulating member 10 surrounds the outer surface of the conductive member 40 except one end portion of the conductive member 40 connected to the PCM 20 and the other end portion of the conductive member 40 connected to the plurality of battery cells 30. That is, the outer surface of the conductive member 40 except a soldering portion 41 and an exposure portion 42 is surrounded by the insulating member 10.

The plurality of conductive members 40 may be integrated by the insulating member 10, and the insulating member 10 may be formed in various shapes easily mounted on the outer surface of the plurality of battery cells 30. Here, the insulating member 10 may be formed with a polyimide (PI) film.

The conductive member 40 is mounted on the spacer 50, and the connection tab 31 passing through the through-hole 51 of the spacer 50 is bent and then mounted on an upper portion of the conductive member 40. In this case, the hook of the spacer 50 is latched into the hole-shaped second fastening portion 32 of the connection tab 31, so that it is possible to perform a soldering operation between the conductive member 40 and the connection tab 31 in the state in which the spacer 50 is fixed.

Figure 3:
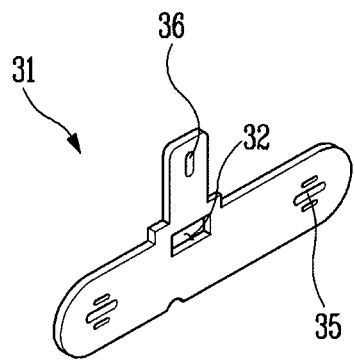
FIG. 3 is a perspective view showing a connection tab according to the present invention.

FIG. 3 is a perspective view showing a connection tab according to the present invention.

Referring to FIG. 3, the connection tab 31 is used to electrically connect the plurality of battery cells 30 (See FIG. 1) to one another. The connection tab 31 may be formed with at least one connection tab so as to connect the plurality of battery cells 30 to one another. The connection tab 31 includes a plurality of first connection portions 35 connected to the battery cells 30 and a second connection portion 36 connected to the conductive member 40 (See FIG. 2). The battery cell 30 and the first connection portion 35 may be connected to each other by soldering, and the conductive member 40 and the second connection portion 36 may be connected to each other by soldering.

The second fastening portion 32 is formed at a position of the connection tab 31, at which the connection tab 31 passes through the through-hole 51 (See FIG. 2) of the spacer 50 (See FIG. 2) and is then bent toward the upper surface of the spacer 50. Here, the second fastening portion 32 is formed at a position corresponding to the hook-shaped first fastening portion 52 (See FIG. 2) formed in the through-hole 51. The second fastening portion 32 may be formed in the shape of a hook latching groove into which the first fastening portion 52 is inserted As described above, the first fastening portion 52 of the spacer 50 is inserted into the second fastening portion 32 of the connection tab 31, so that the spacer 50 can be fixed without the vertical movement thereof. Accordingly, the process of soldering and connecting the second connection portion 36 of the connection tab 31 and the conductive member 40 to each other on the spacer 50.

Figure 4:
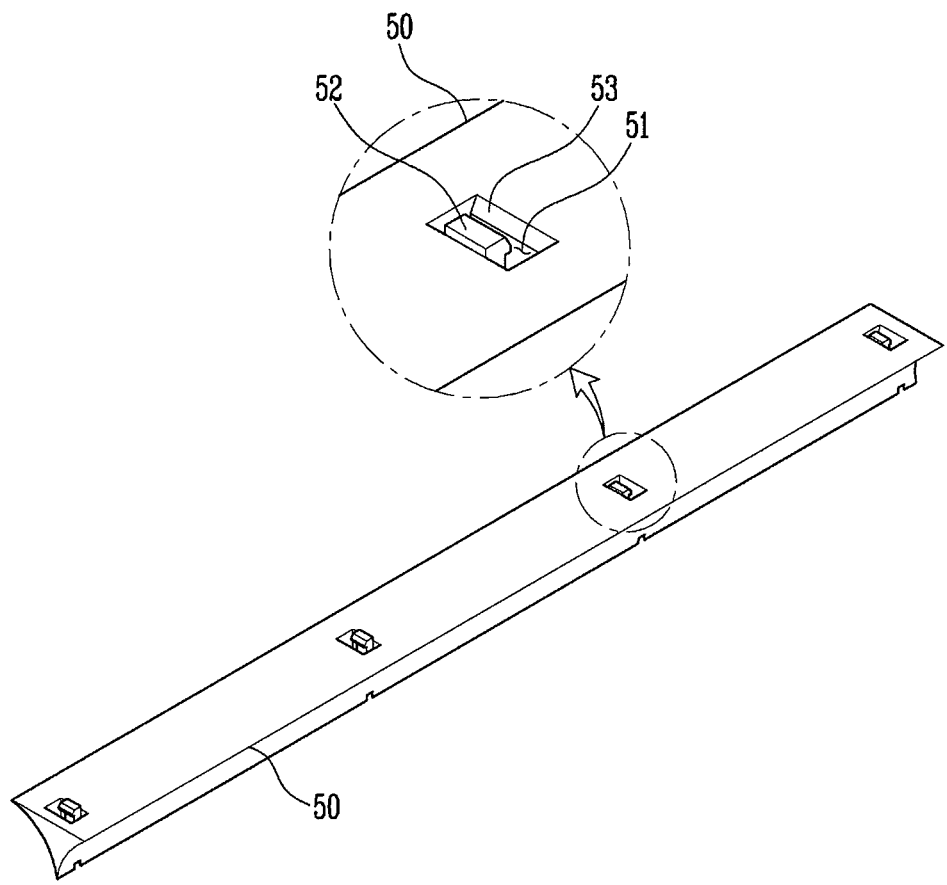
FIG. 4 is a perspective view showing a spacer according to the present invention.

FIG. 4 is a perspective view showing a spacer according to the present invention.

Referring to FIG. 4, the spacer 50 may be positioned in a space between the plurality of battery cells 30 (See FIG. 1) and the case (not shown) for accommodating the plurality of battery cells 30. The spacer 50 may be formed so that, on the vertical section of the spacer 50, the shape of a top surface corresponds to the shape of an inner surface of the case and the shape of a bottom surface corresponds to the shape of an outer surface of the plurality of battery cells 30. That is, the spacer 50 may be inserted into a concave portion between the plurality of battery cells 30 arranged in parallel.

More preferably, the top surface of the spacer 50 is formed in a flat shape corresponding to the inner surface of the case, and the bottom surface of the spacer 50 is formed in an arc shape corresponding to the outer surface of the plurality of the battery cells 30. That is, the spacer 50 has a structure in which the bottom surface is upwardly tapered in directions of both end portions of the top surface, and the upwardly tapered surface of the spacer 50 is formed in an arc shape corresponding to the outer surface of the plurality of battery cells 30.

Accordingly, the spacer 50 can inhibit vibration and movement of the plurality of battery cells 30 due to an external impact, etc., and enables the plurality of battery cells 30 to be stably fixed at a correct position. Here, the battery cell 30 has a cylindrical shape, and the width of the spacer 50 preferably has a size corresponding to an approximately middle portion of two battery cells 30 of which both ends are adjacent to each other.

The through-hole 51 through which the at least one connection tab 31 (See FIG. 2) passes is formed in the spacer 50, and the connection tab 31 is inserted into the though-hole 51 of the spacer 50. The connection tab 31 is bent toward the upper surface of the spacer 50. In this case, the hook-shaped first fastening portion 52 is formed at the one side of the through-hole 51 of the direction in which the connection tab 31 is bent. The first fastening portion 52 is inserted into the hook-latching-hole-shaped second fastening portion 32 (See FIG. 2) formed in the connection tab 31, thereby fixing the spacer 50.

The slope portion 53 formed to be inclined to a predetermined angle may be formed at the other side of the through-hole 51, in which the first fastening portion 52 is not formed. The slope portion 53 may provide a space for more easily fastening the first fastening portion 52 of the spacer 50 to the second fastening portion 32 after the connection tab 31 is inserted into the through-hole 51.

The spacer 50 is not particularly limited as long as it is an electrical insulating material, and may be preferably made of, for example, polymer resin such as polycarbonate (PC) or polyacrylonitrile-butadiene-styrene (ABS), etc. The spacer 50 can be easily manufactured by performing injection molding or press molding on polymer resin and then cutting the polymer resin to have a predetermined size.

Figure 5:
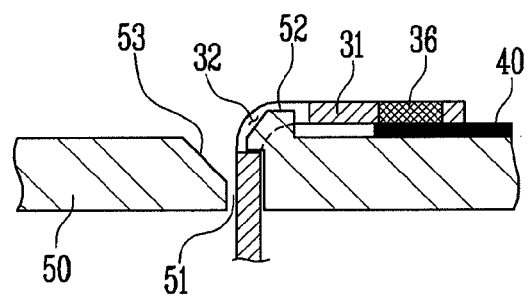
FIG. 5 is a sectional view taken along line A-A' of FIG. 1.

FIG. 5 is a sectional view taken along line A-A' of FIG. 1.

Referring to FIG. 5, the connection tab 31 through which the plurality of battery cells 30 are electrically connected to one another passes the through-hole 51 of the spacer 50 and is then bent toward the upper surface of the spacer 50. In this case, the hook-shaped first fastening portion 52 is formed at the one side of the through-hole 51 of the direction in which the connection tab 31 is bent. The hook-latching-hole-shaped second fastening portion 32 is formed at the position of the connection tab 31 corresponding to the first fastening portion 52. Accordingly, the first fastening portion 52 of the spacer 50 is latched to the second fastening portion 32 of the connection tab 31 while being accommodated in the second fastening portion 32.

Here, the other side of the through-hole 51, in which the first fastening portion 52 is not formed, may be formed in the shape of the slope portion 53 so that the first fastening portion 52 of the spacer 50 is more smoothly fastened to the second fastening portion 32 of the connection tab 31. The second connection portion 36 at the end portion of the connection tab 31 is connected to the conductive member 40 in the state in which the connection tab 31 is bent toward the upper surface of the spacer 50. The conductive member 40 is a component that electrically connects the PCM 20 and the connection tab 31 to each other. The conductive member 40 is positioned between the spacer 50 and the connection tab 31 so as to be connected to the connection tab 31 by soldering.

Figure 6:
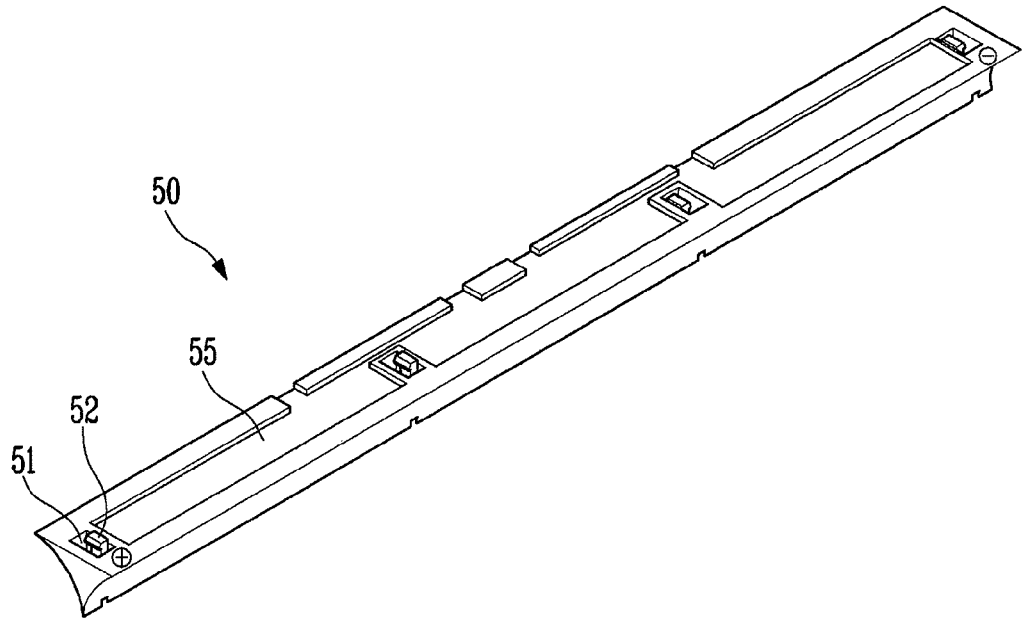
FIG. 6 is a perspective view showing a spacer used in a battery pack according to a second embodiment of the present invention.

FIG. 6 is a perspective view showing a spacer used in a battery pack according to a second embodiment of the present invention.

Referring to FIG. 6, a groove 55 for mounting the conductive member 40 (See FIG. 2) thereon may be formed on the upper surface of the spacer 50 according to this embodiment. The groove 55 is formed on the upper surface of the spacer 50, so that the conductive member 40 for electrical connection between the plurality of battery cells 30 and electrical connection between the PCM 20 and the battery cells 30 can be more easily and stably mounted on the upper surface of the spacer 50.

The groove 55 may be formed in a shape corresponding to the conductive member 40. More preferably, the groove 55 may be formed so that the width of the groove 55 corresponds to that of the conductive member 40 and the depth of the groove 55 approximately corresponds to the thickness of the conductive member 40.

A positive (+) symbol may be formed at one side of the spacer 50, and a negative (−) symbol may be formed at the other side of the spacer 50. Accordingly, it is possible to prevent the direction between positive and negative electrodes of the spacer 50 from being reversed.

Figure 7:
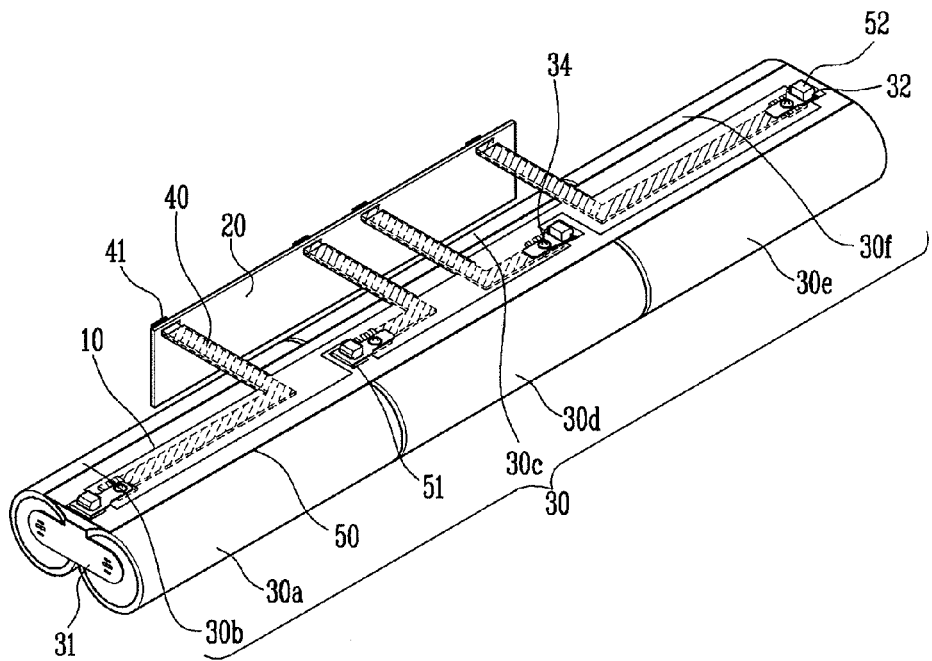
FIG. 7 is a perspective view showing a battery pack according to a third embodiment of the present invention.
Figure 8:
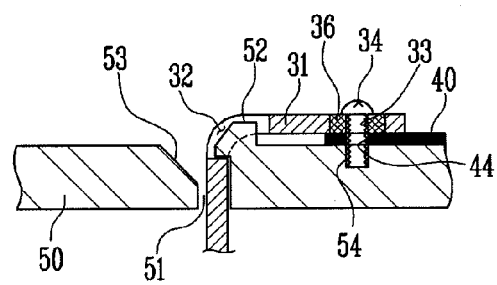
FIG. 8 is a sectional view taken along line B-B' of FIG. 7.

FIG. 7 is a perspective view showing a battery pack according to a third embodiment of the present invention. FIG. 8 is a sectional view taken along line B-B' of FIG. 7.

In FIGS. 7 and 8, the plurality of battery cells 30, the PCM 20, the conductive member 40, etc. are identical or similar to those in the first embodiment, and therefore, their detailed descriptions will be omitted. In the battery pack according to this embodiment, the connection tab 31 and the conductive member 40 are fixed by a fastening member 34.

First, the spacer 50 is positioned between the plurality of battery cells 30 adjacent in parallel. Then, the connection tab 31 is bent toward the upper surface of the spacer 50 through the through-hole 51. In this case, the connection tab 31 and the conductive member 40 may be fixed by the fastening member 34 in the state in which the hook-shaped first fastening portion 52 of the spacer 50 is fixedly inserted into the second fastening portion 32 of the connection tab 31.

Here, first and second fastening holes 33 and 44 are respectively formed in the connection tab 31 and the coverlay 40 so that the fastening member 34 passes therethrough. A coupling groove 54 having the fastening member 34 coupled thereto is formed at a position of the spacer 50 corresponding to the first and second fastening holes 33 and 44. Accordingly, the fastening member 34 can be coupled to the coupling groove 54 by passing through the first and second fastening holes 33 and 44. Here, the coupling groove 54 may have a shape corresponding to an outer surface of the fastening member 34 so that the fastening member 34 such as a screw is coupled to the coupling groove 54.

As described above, the connection tab 31 and the conductive member 40 are fixed by the fastening member 34, so that it is possible to omit a soldering operation and to uniformly maintain the quality of the battery pack.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery pack comprising:
at least one battery;
at least one connection tab member that connects the at least one battery, wherein the at least one connection tab member includes a connection tab that has a coupling component that extends outward from the connection tab member;
a protection circuit module;
a conductive member that electrically interconnects the at least one connection tab member to the protection circuit module;
a spacer that has a member that is engaged with the coupling component of the at least one connection tab when the spacer receives the conductive member and is positioned in a first position proximate the at least one battery, wherein the connection tab of the at least one connection tab member is interconnected to the conductive member and to the member of the spacer wherein the coupling component comprises a first opening and wherein the spacer defines a second opening that receives the connection tab of the connection tab member and wherein the member of the spacer is positioned within the first opening of the connection tab when the connection tab is positioned within the second opening to secure the spacer to the connection tab.

2. The battery pack of claim 1, wherein the at least one battery comprises a plurality of cylindrical batteries.

3. The battery pack of claim 2, wherein the plurality of batteries comprise at least two columns of batteries, wherein sets of batteries in adjacent columns are connected via the connection tab member and wherein the conductive member comprises a plurality of conductive members that connect the sets of batteries to the protection circuit module.

4. The battery pack of claim 1, wherein a surface of the spacer proximate the at least one battery is contoured to match the outer contour of the at least one battery.

5. The battery pack of claim 1, wherein an upper surface of the spacer is contoured to match the inner surface of a case that receives the battery pack.

6. The battery pack of claim 1, wherein the member of the spacer that extends through the first opening in the connection tab member comprises a hook member that engages with the connection tab member adjacent the first opening in the connection tab member.

7. The battery pack of claim 1, wherein the connection tab extends in a first direction, through the second opening and is then bent into a second direction so as to be proximate to an upper surface of the spacer and wherein the conductive member is positioned adjacent the upper surface of the spacer so that the bent portion of the connection tab is connected to the conductive member to thereby interconnect the connection tab member to the protection circuit module.

8. The battery pack of claim 7, wherein the bent portion of the connection tab member is connected to the conductive member via welding.

9. The battery pack of claim 7, wherein the bent portion of the connection tab member includes a coupling opening that is connected to the conductive member via a fastener extending through the coupling opening.

10. The battery pack of claim 9, wherein the spacer comprises a coupling groove wherein the fastener extends through the coupling opening of the connection tab into the coupling groove.

11. The battery pack of claim 1, wherein the member of the spacer that extends through the first opening in the connection tab is positioned on a first side of the second opening and the second side of the second opening opposite the first side has a sloped portion.

12. The battery pack of claim 1, further comprising an insulating member partially surrounding an outer surface of the conductive member.

13. The battery pack of claim 12, wherein the portion of the conductive member between where the coverlay conductive member is connected to the connection tab and to the protection circuit module is insulated by the insulating member.

14. The battery pack of claim 1, wherein the spacer defines a groove that receives the conductive member.

15. The battery pack of claim 14, wherein the groove has a depth and width selected to match the conductive member.

16. The battery pack of claim 1 wherein a first align mark is formed on one side of the spacer and a second align mark is formed on the other side of the spacer wherein the first align mark is different than the second align mark.

17. The battery pack of claim 1, wherein the connection tab member comprises a first and a second connection portions that connect to a first and a second battery respectively.

18. The battery pack of claim 1, wherein the plurality of batteries comprise at least two columns of batteries, wherein sets of batteries in adjacent columns are connected via the connection tab member and wherein the conductive member comprises a plurality of conductive members that connect the sets of batteries to the protection circuit module.

* * * * *